April 14, 1931. C. H. DAY 1,800,679
HAND TRUCK
Filed Jan. 12, 1929
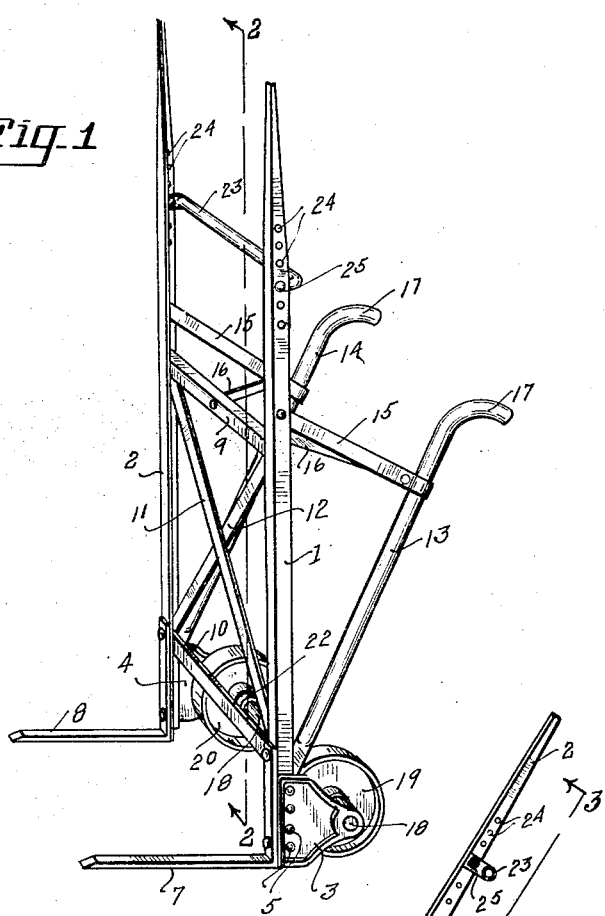
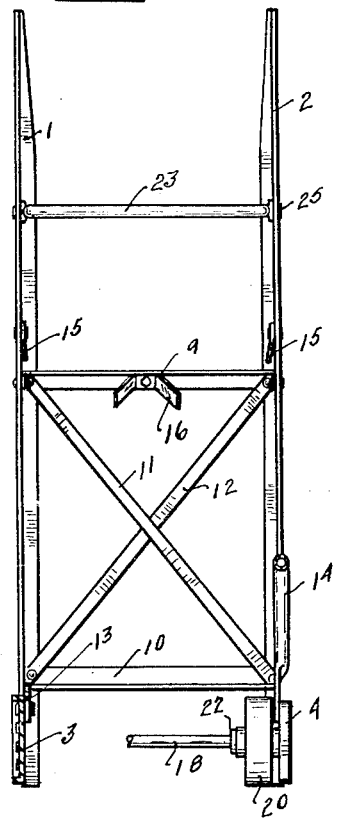
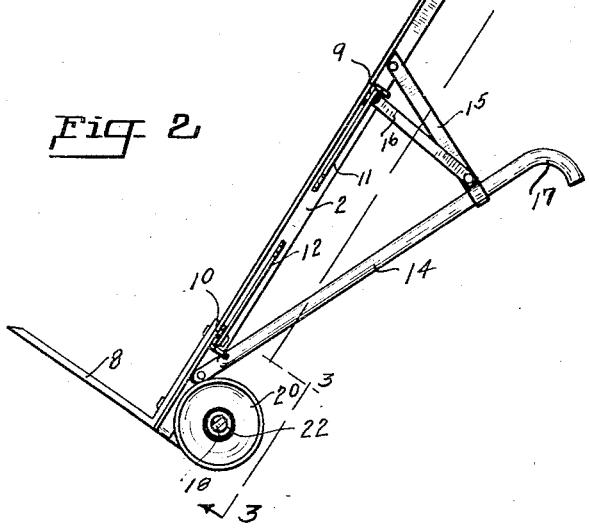
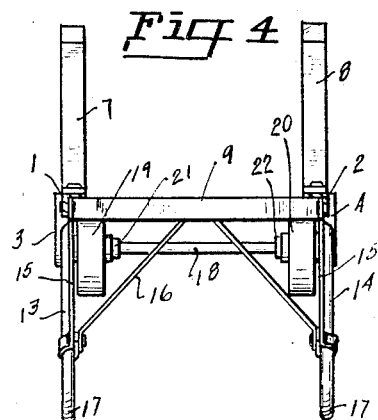
INVENTOR
Charles H. Day
BY
ATTORNEY Patented Apr. 14, 1931

1,800,679

UNITED STATES PATENT OFFICE

CHARLES H. DAY, OF PORTLAND, OREGON

HAND TRUCK

Application filed January 12, 1929. Serial No. 332,017.

My invention relates to hand trucks and is more particularly related to hand trucks to be used for relatively light packaged commodities wherein relatively high loads are to be transported upon the hand trucks as boxes in canneries and the like.

Heretofore trucks of this character have required one hand of the operator to be retained upon one of the bundles, the other hand be required to grasp one of the uprights of the truck against which the packages to be transported are to be supported. Such an arrangement required the operator to stand in a strained position and also threw the body of the operator out of balance, thus making it difficult for the operator to transport a maximum load, and especially a load of maximum height, irrespective of the weight of the same.

In my new and improved construction, the truck is made of all metal, thus reducing the weight of the truck to a minimum, the wheels are mounted upon frictionless bearings, a cross hand bar, adjustably mounted upon the uprights, and the handles being made of tubular material, cross braced, provides a truck that may be handled by an operator that is inexperienced and yet transport loads of maximum height and of maximum weight.

One of the primary objects of my invention consists in producing a truck of minimum weight with maximum strength, so constructed that the operator may safely transport loads of maximum weight and height.

A further object of my invention resides in a simplified construction, having handles so arranged that greatest safety is afforded to the user of the same.

A further object of my invention resides in a construction that maintains the body of the user in position to safely handle loads of maximum weight and height, thereby making it possible for the inexperienced operator to handle the same.

With these and incidental objects in view, the invention consists in certain novel features of construction and combination of parts, the essential elements of which are set forth in the appended claim, and a preferred embodiment of which is hereinafter shown with reference to the drawings which accompany and form a part of this specification.

In the drawings:

Fig. 1 is a perspective, side view of a preferred embodiment of truck shown in upright position.

Fig. 2 is a vertical, sectional view, taken on line 2—2 of Fig. 1, looking in the direction indicated.

Fig. 3 is a rear, sectional view, taken on line 3—3 of Fig. 2, looking in the direction indicated.

Fig. 4 is a rear, end view, of the truck shown in lowered position.

Like reference characters refer to like parts throughout the several views.

My new and improved truck is primarily intended for use in the handling of package goods and more especially adapted for the handling of boxes in canneries and the like, wherein a relatively high tier of boxes or packages is to be handled as a tier of individual units. For such purposes upright posts 1 and 2, upwardly extend from side frames 3 and 4, and are secured thereto by any suitable fastening means, as by rivets 5. Foot members 6 and 7 are disposed at the lower ends of the uprights 1 and 2 and extend outwardly therefrom upon which the boxes or packages to be handled are placed, and the upright members 1 and 2 in the preferred embodiment are made from structural angle bars, and are secured by suitable cross bars 9 and 10 with diagonal bracings 11 and 12. The cross bars 9 and 10 are also preferably made of structural angle bars and are secured to the upright members by any suitable fastening means, as by bolts or rivets. Handle members 13 and 14 upwardly extend from the side brackets 3 and 4 and are disposed in spaced relationship at their upper ends with the uprights 1 and 2 rigidly secured thereto by suitable struts 15 and 16. The handle members are preferably made of tubular stock, as gas pipe, or seamless tubing and each terminates in the handle 17 at its free or outer end. The handle serves as a hand hold in the handle of the truck and also serves as a leg support when the truck is lowered to a substantially horizontal position, as illustrated in Fig. 4. A suitable journal bearing is disposed in the rearwardly disposed end of each of the brackets 3 and 4, into which the shaft 18 is journaled. The shaft 18 is fixedly secured to the brackets by any suitable means and wheels 19 and 20 are rotatably mounted upon the shaft in order to form a free running truck; frictionless bearings are disposed within the tube of the wheels. Collars 21 and 22 are disposed upon the shaft 18 to hold the wheels in normal position. The shaft 18 does not extend beyond the side walls of the brackets 3 and 4, nor do the hubs disposed within which the shaft 18 is journaled, extend beyond the side walls of the brackets 3 and 4 thereby forming a truck that does not offer objectionable projections at the lower end thereof.

Heretofore it has been the general custom for the truckmen to grasp one hand of the handle member when loading the truck and to grasp with the other hand the upper end of the uprights 1 and 2. This throws the body of the user of the truck out of balance. I have found that much better results are obtained and greater loads can be safely hauled by inexperienced truckmen when a cross bar 23 is secured to the uprights 1 and 2. The cross bar 23 has a right angle formed at either end to facilitate engagement with the uprights, in order that the truckman may accommodate the location of the handle bar 23 to the desired position. Adjusting holes 24 are disposed within the side walls of the uprights and the cross bar 23 may be detachably secured thereto by removable fastenings, as bolts 25. By the placing of the handle bar or cross bar 23 to a precise position to accommodate the same to the height of the truckman much better results are obtained.

While the form of mechanism herein shown and described is admirably adapted to fulfill the objects primarily stated, it is to be understood that it is not intended to confine the invention to the one form of embodiment herein shown and described as it is susceptible to embodiment in various forms, all coming within the scope of the claim which follows.

What I claim is:

In a device of the class described, the combination of uprights spaced apart and made of structural angle bars, side frames disposed on the lower ends of the uprights and secured thereto, handle bars made of tubular stock and secured to the side frames and extending at an angle to the uprights, struts disposed between the uprights and the handle bars and secured thereto, bracing cross bars secured to the uprights and maintaining the uprights in spaced relation with each other, diagonal bracings secured to the uprights and to the bracing cross bars, bearings disposed in the side frames and a shaft journaled therein, wheels disposed upon the shaft, the side frames forming an end thrust bearing for one end of the hubs of the wheels and the oppositely disposed ends engaging collars disposed upon the shaft, and a hand engaging cross bar secured at oppositely disposed ends to the uprights, and means for adjustably positioning the hand engaging cross bar relative to the uprights.

CHARLES H. DAY.